United States Patent [19]

Dershem et al.

[11] Patent Number: 5,447,988

[45] Date of Patent: * Sep. 5, 1995

[54] SOLVENT FREE DIE-ATTACH COMPOSITIONS

[75] Inventors: Stephen M. Dershem, San Diego; Dennis B. Patterson, La Jolla; Deborah L. Derfelt, San Diego, all of Calif.

[73] Assignee: Quantum Materials, San Diego, Calif.

[*] Notice: The portion of the term of this patent subsequent to Oct. 25, 2011 has been disclaimed.

[21] Appl. No.: 157,665

[22] Filed: Nov. 23, 1993

Related U.S. Application Data

[63] Continuation of Ser. No. 23,962, Feb. 26, 1993, Pat. No. 5,358,992.

[51] Int. Cl.$^6$ .......................... C08K 3/08; H01B 1/02
[52] U.S. Cl. ..................... 524/780; 524/773; 524/789; 524/439; 252/512; 252/513; 252/514; 252/518; 528/422
[58] Field of Search .......... 528/422, 119, 120; 252/511, 512, 513, 514, 518; 524/434, 435, 438, 780, 789, 284, 291, 440, 441, 261, 305, 320, 773

[56] References Cited

U.S. PATENT DOCUMENTS

| | | | |
|---|---|---|---|
| 4,401,776 | 8/1983 | Munk | 523/443 |
| 4,552,690 | 11/1985 | Ikeguchi et al. | 252/512 |
| 4,604,452 | 8/1986 | Shimp | 528/422 |
| 4,608,434 | 8/1986 | Shimp | 528/422 |
| 4,709,008 | 11/1987 | Shimp | 528/422 |
| 4,740,584 | 4/1988 | Shimp | 528/422 |
| 4,785,075 | 11/1988 | Shimp | 528/422 |
| 4,839,442 | 6/1989 | Craig, Jr. | 528/422 |
| 4,847,233 | 7/1989 | Shimp | 502/171 |
| 4,861,823 | 8/1989 | Qureshi | 524/606 |
| 4,999,699 | 3/1991 | Christie et al. | 357/65 |
| 5,002,818 | 3/1991 | Licari et al. | 428/209 |
| 5,143,785 | 9/1992 | Pujol et al. | 252/512 |
| 5,150,195 | 9/1992 | Nguyen | 528/422 |
| 5,155,066 | 10/1992 | Nguyen | 437/209 |
| 5,358,992 | 10/1994 | Dershem et al. | 524/439 |
| 5,371,178 | 12/1994 | Nguyen | 528/362 |

OTHER PUBLICATIONS

AroCy L-10 Cyanate Ester Monomer, Rhone-Poulenc (4 pg. brochure) dated Oct. 9, 1990.

AroCy Cyanate Ester Resins Chemistry, Properties and Applications, D. A. Shimp, J. R. Christenson and S. J. Ising, Table of Contents, Introduction, pp. 1–9, and 35–36 (Bibliography, dated May, 1991.

D. A. Shimp and W. M. Craig, Jr., entitled New Liquid Dicyanate Monomer for Rapid Impregnation of Reinforcing Fibers, 34th International Sampe Symposium, 1989.

Hi-Tek Polymers, entitled ArcoCy Cyanate Ester Safety and Handling Bulletin, ArcoCy and Handling, May 1989.

Shimp, D. A., Thermal Performance of Cyanate Functional Thermosetting Resins, pp. 41–46.

Primary Examiner—Tae H. Yoon
Attorney, Agent, or Firm—Pretty, Schroeder, Brueggemann & Clark; Stephen E. Reiter

[57] ABSTRACT

In accordance with the present invention, there is provided a novel composition for attaching a semiconductor device to a substrate. The invention composition comprises liquid polycyanate ester monomer, electrically conductive filler, and a curing catalyst, in the substantial absence of alkylphenol. The recognition that attach paste compositions are effective without the addition of alkylphenol has the benefit of reducing the cost of preparation, as well as the ease of preparation of die attach pastes containing electrically conductive filler and polycyanate ester monomer. The incorporation of alkylphenol into die-attach paste compositions has been found to be unnecessary, due to the presence of catalytically active species on the surface of filler flake employed in the preparation of such pastes. Indeed, it is desirable to eliminate alkylphenols from die-attach paste compositions because alkylphenols are acidic species that do not become incorporated into the final polymerized matrix of the cured attach paste. These acidic species can thus leach out, leaving voids in the cured composition and causing corrosion of sensitive electronic parts which come in contact therewith. Optional treatment of filler to render it free of catalytically active metal ions significantly extends the pot life of the composition.

18 Claims, No Drawings

5,447,988

SOLVENT FREE DIE-ATTACH COMPOSITIONS

This is a continuing application of U.S. Ser. No. 08/023,962, filed Feb. 26, 1993, now issued as U.S. Pat. No. 5,358,992, the entire contents of which are hereby incorporated by reference in their entirety.

FIELD OF THE INVENTION

The present invention relates generally to the field of adhesives, and more particularly to die attach compositions for attaching semiconductor devices to carrier substrates.

BACKGROUND OF THE INVENTION

Cyanate ester resins, developed during the 1980s, join epoxy resins and bismaleimide resins as the third major class of thermosetting resins. Polycyanurates or cross-linked cyanate resins are prepared by the cyclopolymerization of aromatic cyanate esters. These cyanate esters are bisphenol derivatives containing a plurality of cyanate functional groups. When heated, the cyanate functionality undergoes exothermic trimerization to form substituted triazine rings. Subsequent curing produces the thermosetting resin.

Cyanate esters are currently employed in rapidly curing adhesive compositions used to bond semiconductor devices or chips, also known as dice, to carrier substrates. Such adhesive compositions include, in addition to the cyanate ester, thermally and/or electrically conductive filler, alkylphenol (as a proton donor participating in the cyclotrimerization cure of the cyanate ester monomer), and a curing catalyst dissolved in the alkylphenol.

Cyanate ester adhesive compositions have eliminated many of the deficiencies inherent in epoxy adhesives and polyimide adhesives, such as low glass transition temperature, high degree of ionic contamination, retention of solvent and lengthy cure. Nevertheless, there still remains room for improvement of die attach pastes containing electrically conductive filler and polycyanate ester monomer in a variety of ways, e.g., in reducing the cost of preparation, as well as the ease of preparation, by avoiding the use of potentially detrimental components (e.g., alkylphenols are acidic species, which are potentially corrosive), by avoiding the use of volatile components (which upon cure tend to bleed out, which may lead to the creation of voids in the cured resin), and the like.

BRIEF DESCRIPTION OF THE INVENTION

In accordance with the present invention, we have developed a novel composition for attaching a semiconductor device to a substrate. The invention composition comprises liquid polycyanate ester monomer, electrically conductive filler and a curing catalyst, in the substantial absence of alkylphenol. Optional treatment of the filler to render it free of catalytically active metal ions significantly extends the pot life of the composition.

DETAILED DESCRIPTION OF THE INVENTION

In accordance with the present invention there is provided a paste composition for attaching a semiconductor device to a substrate, said composition comprising a fluid monomer vehicle comprising at least one polycyanate ester monomer, electrically conductive filler, and a metal catalyst, in the substantial absence of alkylphenol.

As employed herein, the phrase "substantial absence of alkylphenol" refers to alkylphenol levels below that which can be readily determined using available analytical techniques. It is understood by those of skill in the art that "substantial absence" does not exclude the presence of trace quantities of alkyphenols, which may be introduced into the die-attach composition of the invention from a variety of sources. Typically, substantial absence refers to levels of alkylphenol below about 1 part per hundred composition.

It has been found that the curing of cyanate ester monomer is catalyzed by simply admixing monomer with commercially available filler such as silver powder or flake. No added alkylphenol is required to promote this reaction. In addition, it has been observed that catalytically active residues present on the particulate filler material are far more aggressive than the catalysis of cyanate ester cure by traditionally used transition metal catalysts incorporated in the attach paste composition.

Virtually all commercially available filler is coated with one or more lubricants. The lubricants used most often are stearic and oleic acids. The function of lubricants is to prevent agglomeration of the particles (especially powder particles) and to prevent the welding or "coining" of these particles during the mechanical milling process used to produce silver flake products. These fatty acid lubricants become chemically bound to the surface of the metal filler by the formation of metal carboxylate salts (i.e. metal soaps) at the metal filler/lubricant interface.

The formation of carboxylate salts occurs spontaneously according to the following reaction sequence upon exposure of a fatty acid coated silver powder or flake to oxygen:

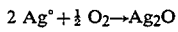

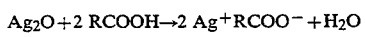

One consequence of the above reaction sequence is that the ability of a filler to catalyze cyanate ester cure is directly proportional to its surface area. In other words, the greater the surface area, the higher the concentration of metal carboxylate salts at the filler surface, and hence the greater the propensity toward catalysis of cyanate ester cure.

To determine what effect various forms of silver have on the catalytic cure of cyanate esters in the substantial absence of alkylphenols, the cure properties of several compositions (none of which contained alkylphenol) were measured using a TA Instruments Differential Scanning Calorimeter (DSC). Table 1 summarizes the results obtained employing the cyanate ester 1,1-bis(4-cyanatophenyl)ethane.

TABLE 1

| Thermal Event | Cyanate Ester, Neat | Cyanate Ester + 1% Ag Octoate | Cyanate Ester + 1% AgOCN | Cyanate Ester + 1% Ag Picolinate | Cyanate Ester + 1% Ag-EDTA |
|---|---|---|---|---|---|
| Exotherm Maxima | 266° C. | 58° C. & 165° C. | 159° C. | 189° C. | 252° C. |
| Exotherm Onset | 204° C. | 35° C. & 78° C. | 96° C. | 99° C. | 176° C. |

As shown in Table 1, a one percent slurry of silver(I) octoate in cyanate ester exhibits a small, low temperature exotherm at 58° C. and an intense exotherm at 165° C. This establishes the pronounced effect of silver octoate on the catalysis of cyanate ester cure, even in the absence of alkylphenol. This cure behavior is very different from the cure behavior of cyanate ester in the absence of both silver carboxylate and alkylphenol. The cure of the uncatalyzed cyanate ester has only a single exotherm with a maximum at 266° C.

The data presented in Table 1 clearly show that chelating agents such as picolinic acid and ethylenediaminetetraacetic acid (EDTA) inhibit the catalytic potential of silver carboxylate with respect to cyanate ester cure.

Subsequently, additional experiments were conducted to determine the effectiveness of various chelating agents on cyanate ester cure in the presence of commercially available silver powder (and in the substantial absence of alkylphenol). These experiments were conducted by (1) dissolving one percent chelating agent (based on the weight of silver powder) in an appropriate solvent such as ketones (e.g., acetone, methyl ethyl ketone (MEK), pentanone, and the like), aqueous ketones (e.g., aqueous acetone, aqueous MEK, and the like), lower alcohols (e.g., methanol, ethanol, isopropyl alcohol, butanol, and the like); aqueous alcohols (e.g., aqueous methanol, aqueous ethanol, aqueous isopropanol, and the like); cyclic ethers (e.g., tetrahydrofuran (THF), dioxane, and the like); aqueous cyclic ethers (e.g., aqueous THF, aqueous dioxane, and the like); and so forth.

(2) adding silver powder to the chelating solution and shaking the mixture vigorously at room temperature for five minutes; and (3) centrifuging the resultant slurry, decanting the supernatant and then resuspending the silver in fresh solvent followed by additional centrifugation and decantation. The rinse procedure was repeated three times. The wet silver solids were air dried. Each powder was then combined with 1,1-bis(4-cyanatophenyl)ethane to produce a slurry of 80% solids. The cure properties of all compositions were then measured by DSC analysis. Table 2 summarizes the results as follows:

TABLE 2

| CHELATING AGENTS | EXOTHERM MAXIMA (°C.) | EXOTHERM ONSET (°C.) |
|---|---|---|
| None (control) | 157 | 101 |
| 1% Thiodipropionic acid | 165 & 216 | 124 |
| 1% Polyethyleneimine | 166 | 120 |
| 1% Dithiosuccinic acid | 207 | 184 |
| 1% Oxalic acid | 165 & 232 | 127 |
| 1% Dimethylpropionic acid | 165 | 110 |
| 1% Citric acid | 170, 205 & 232 | 115 |
| 1% DTPA-Jeffamine M600 Di-amide | 190 | 149 |
| 1% EDTA-Jeffamine M600 Di-amide | 177 & 204 | 143 |
| 1% Acetone dicarboxylic acid | 161 | 112 |
| 1% Thiodiglycolic acid | 219 | 180 |
| 1% Tartaric acid | 210 | 168 |
| 1% DTPA-MPEG-350 Diester | 174 & 218 | 151 |
| 1% DTPA-Oleyl diamide | 222 | 147 |

DTPA-Jeffamine M600 Di-amide and EDTA-Jeffamine M600 Di-amide are reaction products of diethylenetriaminepentaacetic (DTPA) dianhydride or ethylenediaminetetraacetic (EDTA) dianhydride, respectively, and Jeffamine M600, a poly(isopropyleneoxide) marketed by Texaco Chemical Company, Houston, Texas. This poly(propyleneoxide) product is capped at one end with a methoxy group and at the other end with a primary amine group.

DTPA-MPEG-350 diester is the reaction product of DTPA dianhydride and methoxy polyethoxyethanol.

DTPA-Oleyl diamide is the reaction product of DTPA dianhydride and oleyl amine.

As shown in Table 2, all chelating agents tested had some inhibitory effect on the catalysis of cyanate ester cure by silver powder. The most potent inhibitors were thiodiglycolic, dithiosuccinic, and tartaric acids. Tartaric acid is preferred because it contains no sulfur. All chelating agents exemplified in Table 2 have an advantage over EDTA in that they are soluble in acetone. Acetone has the capacity to dissolve fatty acids and this property is particularly useful in stripping silver flake coated with fatty acid lubricant.

Additional chelating agents that are suitable for use in the present invention include hydroxycarboxylic acids (e.g., malic acid, lactic acid, glycolic acid and gluconic acid), aminocarboxylic acids (e.g., 1,6-diaminohexane-N,N,N',N'-tetraacetic, 1,3-diamino-2-hydroxypropane-N,N,N',H'-tetraacetic, 1,2-diaminocyclohexane-N,N,N',N'-tetraacetic acid, diethylenetriaminepentaacetic acid, N-hydroxyethylenediaminetriacetic acid, nitriloacetic acid and ethylenediaminetetraacetic acid), as well as amides and esters derived from such acids or their anhydrides.

Thiocarboxylic acids suitable for use as chelating agents in the present invention include, in addition to those already mentioned, thioglycolic acid and thiosalicylic acid.

Chelating agents are believed to retard unwanted catalysis by displacing fatty acids from metal carboxylates present on the surface of the filler. A simple test confirmed this theory. Approximately 0.50 g of silver octoate was weighed into each of two vials. An identical quantity of acetone was added to each vial. One half gram of tartaric acid was then added to the first vial while the second vial had no further additions (the second vial was used as a control for the first vial). Both vials were sealed and heated at 40° C. for 70 hours. Residual acetone from both vials was decanted off and collected. The solid residue remaining in each vial was washed with fresh acetone which was also decanted and collected. The residue in each vial was rinsed several times and the combined rinses then evaporated to dryness. No residue remained when rinses from the second vial had evaporated to dryness. The washings from the first vial left a large mass of an oily, solid slurry. This residue was extracted with hexane and the hexane soluble fraction was then concentrated and analyzed. The IR trace for the oily liquid obtained after all of the hexane had been evaporated was identical to that of pure octanoic acid. The yield of this acid was almost quantitative based upon the amount of silver octoate used. This experiment demonstrates that the following reaction occurs:

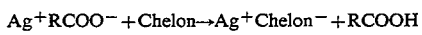

The chelating agents shown in Table 2 are ionic chelating agents. Non-ionic chelating agents such as N,N,N', N'tetrakis(2-hydroxypropyl)-ethylenediamine or tris[2-(2-methoxyethoxy)ethylamine]amine are ineffective at quenching the catalysis. Presumably, the ineffectiveness of these non-ionic chelating agents resides in the absence of any sufficiently acidic protons to participate in the above reaction.

The significance of the reaction shown above is that it represents a mechanism by which metal carboxylates (i.e. metal soaps) can be eliminated from the surface of metal filler particles, thereby substantially decreasing or eliminating the catalytic potential of such soaps.

Agents in Table 2 that possess chelating properties as well as lubricating properties are DTPA- and EDTA-Jeffamine M600-Di-Amides. These agents, as discussed earlier, are reaction products of DTPA or EDTA dianhydride with a poly(propyleneoxide)monoamine. Use of such chelating lubricants in the attach paste compositions of the invention permits chelation of metal ion while at the same time providing lubrication of filler particles (especially powder particles). Lubrication of filler particles is especially important to prevent agglomeration of the particles and to prevent welding or "coining" of the particles during mechanical milling processes used to produce the filler.

Poly(alkyleneoxide)-derived chelating lubricants are infinitely miscible with the monomer vehicle employed herein. The significance of this becomes apparent when filler treated with a fatty acid lubricant is added to the same monomer vehicle. Pastes containing filler treated with the chelating lubricants described herein can be loaded to higher solids content (while maintaining acceptable viscosity) than pastes containing filler treated with fatty acid lubricants. This is a significant advantage because both the electrical and thermal conductivity of the final fired paste will be enhanced by loading at higher solids.

Additional agents having both chelating and lubricating properties can be prepared by reaction of the dianhydride of either diethylenetriaminepentaacetic acid (DTPA) or ethylenediaminetetraacetic acid (EDTA) with two equivalents of a homo- or co-oligomeric poly-(alkylene oxide) capped at one end with an alkoxy or aryloxy group and at the other end with either an amino group or an hydroxy group. Opening of the anhydride ring with an amino function yields an amide. Opening of the anhydride ring with an hydroxy function yields an ester. In both cases, a carboxylic acid function is obtained as well. Opening both rings of either dianhydride results in the covalent bonding of two capped poly-(alkylene oxide) chains to a central chelating moiety which is a derivative of either DTPA or EDTA. Oligomeric poly(alkylene oxides) suitable for reaction with DTPA or EDTA include, for example, methoxy polypropoxyisopropylamine, butyloxy polyisopropoxyisopropylamine, methoxy polyethoxyethanol, nonylphenoxy polyethoxyethanol and the like.

In addition to the use of chelating agents to inhibit the catalytic potential of metal carboxylates on the surface of metal filler, the present invention also relates to the use of other agents to inhibit this unwanted catalysis.

A second group of substances found to be useful in retarding unwanted catalysis are mild reducing agents including covalent hydrides such as, for example, silicon hydrides, boron hydrides, aluminum hydrides, and the like.

Covalent hydrides contemplated for use in the practice of the present invention include silicon hydrides, boron hydrides or aluminum hydrides of the formula:

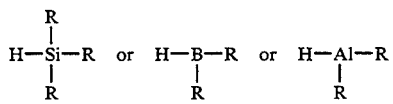

wherein each R is independently hydrogen or a hydrocarbyl radical of 1 up to 20 carbon atoms. Examples of silicon hydrides contemplated for use in the practice of the present invention include triphenylsilane, dimethyl octadecylsilane, diethylmethylsilane, diphenylmethylsilane, phenylsilane, ethyldimethylsilane, n-hexylsilane, methylphenylsilane, octadecylsilane, octylsilane, pentamethyldisiloxane, phenyldimethylsilane, phenylmethylvinylsilane, tetramethyldisiloxane, triethylsilane, trihexylsilane, triisopropylsilane, trimethyldisilane, trimethylsilane, tri-n-octylsilane, tri-n-propylsilane, bis(dimethylsilyl)benzene, bis(dimethylsilyl)phenylether, 1,3-bis(trimethylsiloxy)-1,3-dimethylsiloxane, diethylsilane, dimethylsilane, 1,3-diphenyl-1,3-dimethyldisiloxane, diphenylsilane, methylphenylsilane, and the like; as well as poly (hydroalkyl) siloxanes or hydroalkyl dialkylsiloxane copolymers of the formula:

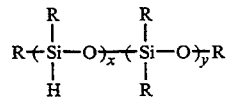

where R is as defined above, x falls in the range of 3 up to 200, and y falls in the range of 0 up to 900.

Examples of boron hydrides contemplated for use in the practice of the present invention include 9-borabicyclo[3.3.1]nonane, thexylborane, disiamylborane, and the like, as well as Lewis base complexes of borane such as borane-tetrahydrofuran, borane-methylsulfide, borane-pyridine, borane-trimethylamine, borane-triethylamine, and the like.

Examples of aluminum hydrides contemplated herein include aluminum hydride (preferably as its Lewis acid-base complex with tetrahydrofuran), diisobutylaluminum hydride, and the like.

The impact of silicon hydrides on catalysis by metal carboxylate salts was observed when powdered silver octoate was added to a solution of dimethylphenyl silane in acetone. A vigorous reaction occurred with the precipitation of silver metal along with the evolution of heat and hydrogen gas. It is believed that the following reactions occur:

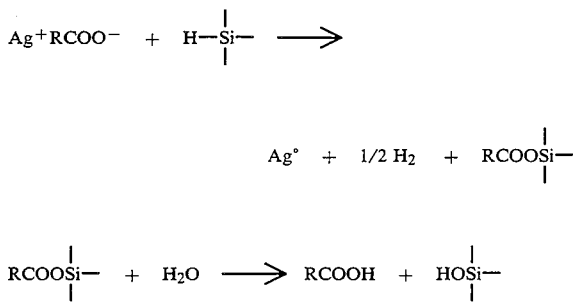

The above sequences show that the initially formed silyl ester is subsequently hydrolyzed in the presence of trace moisture to regenerate the free carboxylic acid.

The effectiveness of metal hydrides, such as silicon hydrides, on the catalytic cure of cyanate esters was measured using DSC analysis. In one experiment, a control paste comprising 80% silver flake in 1,1-bis(4-cyanatophenyl)ethane cured to a plastic solid in less than 10 hours at room temperature and exhibited an exotherm maxima at 139° C. A test paste was prepared with the addition of 5% by weight of bis(dimethylsilyl)-benzene dissolved in 1,1-bis(4-cyanatophenyl)ethane. The test paste remained a paste when stored at room temperature for approximately thirty hours. DSC analysis on the hydride treated paste revealed that the exotherm maxima had been shifted up to 187° C. The onset temperatures for the test paste and control paste were 92° and 101° C., respectively.

In a second experiment, a control paste comprising 80% silver powder in 1,1-bis(4-cyanatophenyl) ethane exhibited an exotherm maxima of 155° C. and an onset temperature of 105° C. A test paste was prepared with the addition of 5% by weight diphenylmethyl silane in 1,1-bis(4-cyanatophenyl)ethane. The test paste had an exotherm maxima of 201° C. immediately after it was prepared. Five hours later the paste had an exotherm maxima of 218° C. However, after 24 hours it had dropped to 195° C. The shift in the exotherm of the test paste suggested some degree of change was occurring in the paste over time, i.e., storage of the test paste in the presence of air permitted some regeneration of catalytic species.

Subsequent experiments revealed that treating metal flake or powder with a silicon hydride followed by treatment with chelating agent(s) afforded a more powerful inhibition of inadvertent catalysis than can be obtained with either agent alone.

A third group of agents useful in retarding unwanted catalysis are non-ionic lubricants. Examples of such lubricants include, for example, fatty acid monoesters of glycerol such as glycerol monooleate. Use of non-ionic lubricants is particularly advantageous because of the superior pot life of pastes containing filler treated with such agents. For example, the pot life of pastes made with fatty acid coated flake is only about 6 hours at room temperature. When flake of approximately the same surface area is treated with a non-ionic lubricant and incorporated into a paste, the pot life of the paste is increased to a minimum of 18 hours and a maximum of 48 hours. The pot life extension associated with filler treated with non-ionic lubricant is especially apparent for filler particles having a low surface area. It may be that particles having a higher surface, even when treated with non-ionic lubricant, still have some carboxylate salt contamination.

Examples of electrically conductive fillers which are rendered substantially free of catalytically active metal ions according to the present invention include, for example, silver, nickel, cobalt, copper and aluminum fillers, as well as alloys of such metals. Both powder and flake forms of filler may be used in the attach paste compositions of the present invention. The preferred thickness of flake is under 2 microns with a dimension of about 20 to about 25 microns. Flake employed herein preferably has a surface area of about 0.15 to 5.0 $m^2/g$ and a tap density of 0.4 to 5.5 g/cc. Powder employed herein preferably has a diameter of about 0.5 to 15 microns.

Electrically conductive fillers are optionally rendered free of catalytically active metal ions according to the present invention by treatment with chelating agents, reducing agents or non-ionic lubricating agents or mixtures of such agents. Treating solutions are prepared by adding the agent(s) to a suitable solvent such as a lower alkyl ketone (e.g., acetone), a lower alcohol (e.g., isopropyl alcohol), and the like. Filler is then added to the treating solution to obtain a slurry containing approximately 50 wt. percent filler in a treating solution containing from about 0.5 to 10 wt. percent treating agent based on total weight of filler. The resulting slurry is agitated at room temperature for a minimum of five minutes up to 48 hours. The amount of time will vary depending on the quantity of metal soap on the filler being treated.

The die attach paste compositions of the invention employ monomer vehicle comprising at least one polycyanate ester monomer, in the substantial absence of alkylphenol. It has been found that polycyanate ester monomer performs a vital role in die attach paste compositions, particularly when a paste is used in hermetic packages. It is well known that the cyanate function reacts readily with moisture. This reaction is used to provide a powerful gettering action on residual moisture left in a hermetic package after it has been sealed.

Monomer vehicle contemplated for use in the practice of the present invention is liquid under ambient conditions. This property ensures that paste compositions will not be compromised by monomer crystallization during use, and also avoids the need for extraneous solvent/diluent (e.g., alkylphenol) as an aid to vehicle preparation. While it is possible to heat a sample of paste until all of the monomer is melted, this puts an unreasonable burden on the user. Furthermore, the user may not be able to ascertain when all of the monomer is melted. Use of a non-homogenous paste could result in failures in die attach.

In the present invention, use of a polycyanate ester monomer having a melting point above ambient temperature is not precluded, even in the absence of an alkylphenol as solvent/diluent and co-catalyst because such a monomer can be combined with one or more other monomers which are selected so that the melting point of the resultant monomer mixture is lowered to provide a liquid monomer vehicle at ambient temperature. Liquid monomer vehicles contemplated herein include vehicles selected from the group consisting only of liquid monomers; vehicles selected from the group consisting of solid monomer(s) miscible and/or soluble in liquid monomer(s); and vehicles selected from the group consisting of solid monomers which, when combined, provide a liquid monomer mixture.

Monomer(s) which may be combined with polycyanate ester monomer is/are selected based on the following criteria: the monomer(s) should be soluble in or miscible with polycyanate ester monomer and should be non-reactive with polycyanate ester monomer at ambient temperatures, unless such reaction(s) is reversible at temperatures above ambient temperature.

Cyanate ester monomers that can be employed in the present invention contain two or more ring forming cyanate (—O—C≡N) groups which cyclotrimerize to form substituted triazine rings upon heating. Because no leaving groups or volatile byproducts are formed during curing of the cyanate ester monomer, the curing reaction is referred to as addition polymerization. Suitable polycyanate ester monomers that may be used in the present invention include, for example, 1,1-bis(4-cyanatophenyl) methane, 1,1-bis(4-cyanatophenyl)ethane, 2,2-bis(4-cyanatophenyl)propane, 1,3-bis[2-(4-cyanatophenyl) propyl]benzene, and the like. Polycyanate ester monomers utilized in the present invention may be readily prepared by reacting appropriate dihydric phenols with a cyanogen halide in the presence of an acid acceptor.

Monomers that may be combined with polycyanate ester monomer(s) in the present invention are selected from those monomers which undergo addition polymerization. Such monomers include vinyl ethers, divinyl ethers, diallyl ethers, dimethacrylates, dipropargyl ethers, mixed propargyl allyl ethers, monomaleimides, bismaleimides, and the like. Examples of such monomers include cyclohexanedimethanol monovinyl ether, trisallylcyanurate, 1,1-bis (4-allyloxyphenyl)ethane, 1,1-bis (4-propargyloxyphenyl)ethane, 1,1-bis(4-allyloxyphenyl-4'-propargyloxyphenyl)ethane, 3-(2,2-dimethyltrimethylene acetal)-1-maleimidobenzene, 2,2,4-trimethylhexamethylene-1,6-bismaleimide, 2,2-bis[4-(r-maleimidophenoxy)phenyl]propane, and the like.

Various monomers may be combined to obtain a liquid monomer vehicle, without the need for any added solvent/diluent, such as alkylphenol. For example, when 1,1-bis(4-cyanatophenyl)ethane, having a melting point of 29° C. and 2,2,4-trimethylhexamethylene-1,6-bismaleimide, having a melting point range of 75° to 125° C., were combined (in the absence of alkylphenol), mixtures containing up to 12 wt. percent bismaleimide were found to remain liquid indefinitely. The lowest melting mixture contained 8 wt. percent bismaleimide and had a melting point of 26.07° C., which is three degrees below the melting point of 1,1-bis(4-cyanatophenyl)ethane. The viscosity of this mixture was lower than that of the pure dicyanate ester. Surprisingly, the thermal stability of polymer derived from this mixture exceeded the thermal stability of the polycyanate ester homopolymer. Thermal stability was determined using thermogravimetric analysis run at a temperature ramp rate of 10° C./minute under an air purge. The decomposition onset temperature for the polymer derived from the mixture was 438° C., whereas the decomposition onset temperature for the homopolymer was 419° C.

When 1,1-bis (4-cyanatophenyl) ethane (melting point=29° C.) and 2,2-bis(4-cyanatophenyl)propane, having a melting point of 79° C., were combined (in the absence of alkylphenol), mixtures containing up to 20 wt. percent 2,2-bis (4-cyanatophenyl) propane were found to remain liquid indefinitely at room temperature. These mixtures behaved as supercooled liquids that were more resistant to crystallization than pure 1,1-bis (4-cyanatophenyl)ethane. The lowest melting mixture contained approximately 15 wt. percent 2,2-bis (4-cyanatophenyl) propane and had a melting point of 24.43° C., which is over four degrees below the melting point of 1,1-bis (4-cyanatophenyl) ethane. The viscosity of this mixture was lower than that of pure 1,1-bis (4-cyanatophenyl)ethane. The polymer derived from this mixture also had higher thermal stability than the homopolymer derived from pure 1,1-bis (4-cyanatophenyl) ethane. The decomposition onset temperature for the polymer derived from the mixture was 435° C., which is approximately sixteen degrees higher than the decomposition onset temperature for the homopolymer derived from 1,1-bis (4-cyanatophenyl) ethane.

When 1,1-bis (4-cyanatophenyl)ethane (melting point=29° C.) and 1,1-bis (4-propargyloxyphenyl)ethane, having a melting point of 39° C., were combined (in the absence of alkylphenol), mixtures containing from about 15 to 50 wt percent dipropargyl ether were found to remain liquid indefinitely at room temperature. A mixture containing 40 wt. percent dipropargyl ether did not crystallize when seeded with crystals from each monomer and stored at 5° C. The viscosity of this mixture was approximately the same as that of the homopolymer derived from 1,1-bis(4-cyanatophenyl) ethane. The thermal stability of polymer derived from this mixture was lower than that of the polycyanate ester homopolymer. The decomposition onset temperature for the polymer derived from the mixture was 355° C. It is believed that the polymerized mixture consists of an interpenetrating network of cyanate and propargyl resins since differential scanning calorimetric studies indicate the presence of two separate cure events. Despite the lower decomposition onset temperature, this mixture is suitable for use for die attach in solder seal hermetic packages since such assemblies are usually processed at 330° C. or lower.

When 1,1-bis(4-cyanatophenyl) ethane (melting point=29° C.) and 3-(2,2-dimethyltrimethylene acetal)-1-maleimidobenzene, having a melting point of 106° C., were combined (in the absence of alkylphenol), mixtures containing from about 5 to 30 wt. percent monomaleimide were found to remain liquid indefinitely at room temperature. A mixture containing approximately 25 wt. percent monomaleimide remained liquid even when seeded with crystals from each monomer and stored for several days at 5° C. The viscosity of this mixture was approximately twice that of the pure dicyanate ester. The thermal stability of the polymer derived from this mixture was somewhat lower than that of the polycyanate ester homopolymer. The decomposition onset temperature for the polymer derived from the mixture was 395° C., or about 24 degrees lower than the decomposition onset temperature of the polycyanate ester homopolymer. Despite the lower temperature, the mixture is suitable for use in solder seal hermetic, microelectronic packages because the highest temperature required to seal these packages is far lower than the decomposition temperature for the polymer derived from the mixture.

In accordance with the present invention, it has been found that the melting point of 1,1-bis(4-propargyloxyphenyl)ethane can be significantly depressed by the partial reduction of the propargyl function to allyl. Approximately 20% of the propargyl groups had to be reduced to allyl in order for the product to be a room temperature-stable liquid. It is also necessary to keep the total fraction of allyl groups below 30% since the allyl moiety does not produce an independent cure. When the 20/80 allyl/propargyl monomer was combined with 1,1-bis(4-cyanatophenyl)ethane, it was found that from 5 to 100 wt. percent allyl/propargyl monomer provided stable liquids at room temperature. Mixtures containing at least 30% of the 20/80 allyl/propargyl monomer did not freeze at 5° C., even when seeded with crystals of 1,1-bis(4-cyanatophenyl) ethane. The viscosity of the mixture was approximately the same as that of the dicyanate ester. The onset for thermal degradation in air was 383° C. for polymer derived from the mixture containing 30% allyl/propargyl monomer. This thermal stability was considered more than adequate for reasons stated above.

Cyclohexanedimethanol monovinyl ether, a liquid, is miscible in all proportions with 1,1-bis(4-cyanatophenyl)ethane, even in the absence of added solvent/diluent, such as alkylphenol. The vinyl ether monomer significantly depresses the viscosity of the dicyanate ester monomer when present at a concentration of at least 5 wt. percent. The presence of just 5 wt. percent monovinyl ether monomer also enhances the supercooling behavior of the dicyanate ester monomer. Mixtures containing at least 25 wt. percent monovinyl ether monomer did not freeze at 5° C., even when seeded with crystals of the dicyanate ester monomer. The decomposition onset temperature in air is 363° C. for polymer derived from a mixture consisting of 20 wt. percent monovinyl ether monomer and 80 wt. percent dicyanate ester monomer. This polymer is also suitable for use for die attach in solder seal packages.

When 1,1-bis(4-cyanatophenyl)ethane (melting point=29° C.) and 2,2-bis[4-(4-maleimidophenoxyphenyl]propane, having a melting range of 110° to 170° C., were combined (in the absence of alkylphenol), mixtures containing at least 20 wt. percent bismaleimide monomer remained fluid at 5° C., even when seeded with crystals of the dicyanate ester monomer. The viscosity of a mixture containing approximately 20 wt. percent bismaleimide monomer was about twice that of the pure dicyanate ester monomer. Compositions containing less than 30 wt. percent bismaleimide monomer were found to be suitable for use in die attach pastes. The decomposition onset temperature for a mixture containing 15 wt. percent bismaleimide monomer and 85 wt percent dicyanate ester monomer was 431° C., which is approximately the same as the polycyanate ester homopolymer.

When 1,1-bis(4-cyanatophenyl)ethane (melting point=29° C.) and 2,2-bis(4-methacryloxy)propane, having a melting range of 72°-74° C., were combined (in the absence of alkylphenol), mixtures containing at least 25 wt. percent dimethacrylate monomer remained fluid at 5° C, even when seeded with crystals of the dicyanate ester monomer. Mixtures containing only 5 wt. percent dimethacrylate monomer were more resistant to freezing than the dicyanate ester monomer alone. The viscosities of mixtures containing up to 35 wt. percent dimethacrylate monomer were approximately the same as the viscosity of pure dicyanate ester monomer. The onset for thermal decomposition in air for a mixture containing 20 wt. percent dimethacrylate monomer was 409° C., which is only slightly lower than the decomposition onset temperature of the polycyanate ester homopolymer.

Metal catalysts employed in the present invention are metal acetylacetonates which are metal chelates wherein the preferred metal is a transition metal. Examples of suitable metals employed herein are cobalt, manganese, tin, zinc, copper and nickel, all in the divalent state; manganese, iron, cobalt and aluminum, all in the trivalent state; and tetravalent titanium. The presently most preferred metal catalyst is cobalt(III) acetylacetonate.

The attach paste compositions of the invention are prepared by mixing monomer vehicle, treated filler and catalyst (in the absence of alkylphenol), in a planetary mixer under vacuum or in inert atmosphere for about 30 minutes to 1 hour. Thereafter, the homogeneous paste which is obtained is subjected to additional mixing on a three-roll mill for a minimum of fifteen minutes at room temperature. The paste is preferably stored at low temperatures, e.g. −40° C. until needed.

The amount of monomer vehicle, treated filler and metal catalyst employed in the attach paste compositions of the invention is important if satisfactory attach pastes are to be obtained. In accordance with one aspect of the present invention, the use of solvents and/or diluents, such as alkylphenols, is not required. Based on the total weight of the attach paste, the monomer vehicle (substantially free of alkylphenol) is present in the range of about 8 to about 20 wt. percent; the optionally treated filler is present in the range of about 80 to about 92 wt. percent; and the metal catalyst is present in the range of 50 to about 1500 ppm.

It may be desirable to incorporate one or more additives in attach paste compositions of the invention in order to alter certain characteristics. Examples of such additives include, for example, fumed silica and certain antioxidants.

Incorporation of a small amount of fumed silica may be beneficial in that it reduces the amount of liquid bleed that can occur during the curing process. Specifically, introduction of fumed silica reduces the amount of uncured monomer that wicks out onto the substrate. Minimizing liquid bleed is desirable since excessive spread of monomer can result in contamination of the die being attached to the substrate. The addition of a small amount of fumed silica can also be used to increase the thixotropic index of a paste. This effect is particularly important when low surface area metal fillers are employed in an attach paste. In the absence of fumed silica, such a paste composition may give a "taily dispense", a term referring to a paste that does not break off cleanly from an automatic dispensing head. This results in a tail of paste dragging across a component during the assembly process, which may make the component unusable. When fumed silica is incorporated in the paste compositions of the invention, the amount will vary from about 0.2 wt. percent to about 2 wt. percent.

It is well known to those skilled in the art that the thermo-oxidative stability of a high temperature polymer can be improved by the incorporation of an antioxidant. Use of an antioxidant in paste compositions containing high temperature polymers and finely divided silver can be very beneficial. Silver metal can act as an oxidation catalyst and contribute to early thermal degradation. This effect is especially evident when the filler employed is a high surface area silver powder. Moreover, the severity of the problem increases as the solids loading of silver powder increases. For example, thermal degradation onset for a paste loaded with 85 wt. percent silver powder is about 390° C. A paste made with identical ingredients loaded by only 80 wt. percent silver powder had a decomposition onset around 400° C. It is desirable to be able to load the silver content as high as possible in order to obtain the highest possible thermal and electrical conductivity. Incorporation of from about 0.5 to about 1.0 wt. percent antioxidant can substantially improve the thermal stability of attach paste compositions containing silver powder. The onset of thermal decomposition for an attach paste containing 85 wt. percent silver powder and 0.5 wt. percent antioxidant was 410° C. The onset for thermal decomposition of a control paste containing no antioxidant was approximately 20° C. lower. Antioxidants that are suitable for use in the attach paste compositions of the invention include, for example, 4,4'-dioctyldiphenylamine, 3,3'diethyl-5,5'-dinonyldiphenyl amine, and the like.

The invention will now be described in greater detail by reference to the following non-limiting EXAMPLES.

EXAMPLE A

Diethylenetriaminepentaacetic dianhydride (DTPA dianhydride) (0.26 g) was added with stirring to a solution of 0.84 g of Texaco Jeffamine M600 in 2 g of anhydrous N-methylpyrrolidone. The reaction mixture was allowed to stand for two hours at 60° C. and then diluted with 20 ml of cyclohexane. Two liquid phases formed (Jeffamine M600 is fully miscible with cyclohexane). The larger supernatant phase was decanted and the remaining phase stirred with 20 ml of fresh cyclohexane which was also subsequently decanted. This procedure was repeated with two more 20 ml portions of cyclohexane and the final residual liquid dried under vacuum at 50° C. overnight. A yield of 1.00 g of DTPA-Jeffamine M600 diamide was obtained as a viscous liquid.

EXAMPLE B

The procedure of EXAMPLE A was repeated using 0.20 g of ethylenediaminetetraacetic dianhydride (EDTA dianhydride) and 0.90 g of Texaco Jeffamine M600. A yield of 0.77 g of EDTA-Jeffamine M600 diamide was obtained as a viscous liquid.

EXAMPLE C 1,1-Bis(4-hydroxypenyl)ethane (50.0 g) and 150 ml of dimethylsulfoxide were added to a double-necked 500 ml flask, fitted with a mechanical stirrer and cooled in an ice/water bath. Stirring was continued until all solid material had dissolved. Thereafter, an equivalent of powdered potassium hydroxide was added portion wise to the reaction mixture over a period of one hour with stirring. After the addition of base, 37.25 g of propargyl chloride was added drop wise through a liquid addition funnel over a one hour period. After addition of propargyl chloride was complete, the ice bath was removed and the solution was stirred for an additional two hours.

The crude bispropargyl ether was recovered by first diluting the reaction mixture with an equal volume of water and then washing the aqueous phase 3× with methylene chloride. The organic washes were combined and washed once with dilute aqueous base followed by 2× washings with water. The organic phase was dried over magnesium sulfate. Using a rotary evaporator, the solvent was removed by first evaporating under atmospheric pressure and then stripping at reduced pressure and elevated temperature (<80° C.).

The crude ether was distilled using a falling film molecular distillation apparatus using chlorobenzene as a refluxing solvent.

Hydrogenation of the bispropargyl ether was performed in ethanol at room temperature using an atmospheric hydrogenation apparatus and Lindlar's catalyst (1% w/w). Based on hydrogen uptake, hydrogenation was continued until a 20–30% conversion was achieved. Quantitative determination of conversion was followed by means of proton NMR.

Final purification of the mixture of bispropargyl, bisallyl(trace), and propargylallyl ethers of 1,1-bis(4-hydroxyphenyl)ethane was performed by first evaporating solvent by means of a rotary evaporator and then stripping remaining trace solvent by means of two passes through a falling film molecular distillation apparatus using isopropyl alcohol as the refluxing solvent and pressures at or below 0.5 Torr.

EXAMPLE D

3-Nitrobenzaldehyde (100.0 g, 0.622 moles), 75.0 g (0.721 moles) neopentyl glycol, a crystal of p-toluenesulfonic acid and 300 ml of benzene were added to a two-neck 500 ml round bottom flask fitted with a Dean-Stark water trap and a reflux condenser. The reaction mixture was gently refluxed under an inert atmosphere until no more water was collected. Approximately 12.1 ml of water were recovered in a 24 hour period.

The crude product was isolated by evaporation of benzene and recrystallized from isopropyl alcohol to obtain 141.9 g (90.5% yield) of 3-(2,2-dimethyltrimethylene acetal)-1-nitrobenzene.

Potassium formate (85.0 g, 4.72 moles), 85.0 g (4.72 moles) of water, 300 ml of ethanol and 120.0 g (0.506 moles) of 3-(2,2-dimethyltrimethylene acetal)-1-nitrobenzene were added to a three-neck 1 liter round bottom flask fitted with a mechanical stirrer, a reflux condenser and a thermometer. The reaction mixture was stirred and heated in a water bath where the temperature was gradually increased. When the temperature reached 70° C., 0.2 g of 10% Pd/C catalyst was added to the reaction mixture. After the initial exotherm subsided, an additional 1.00 g of 10% Pd/C catalyst was added and the reaction mixture was heated for an additional 2 hours at 70° C.

The crude product was isolated by filtration of the reaction mixture, followed by evaporation of solvent. The recovered product was then diluted with methylene chloride and washed twice with 100 ml of water. The organic phase was separated and dried over magnesium sulfate. Solvent was then evaporated to obtain 101.5 g (96.9% yield) of 3-(2,2-dimethyltrimethylene acetal)-1-aminobenzene as a light yellow solid.

Maleic anhydride (45.0 g, 0.459 moles) and 200 ml of t-butylmethyl ether were added to a three-neck 500 ml round bottom flask fitted with a mechanical stirrer, reflux condenser and a powder addition funnel. The mixture was stirred at room temperature until all solids were dissolved. Thereafter, 90.0 g (0.435 moles) of 3-(2,2-dimethyltrimethylene acetal)-1-aminobenzene, contained in the powder addition funnel, was added to the reaction mixture with stirring over a one-half hour period. After the addition was complete, stirring was continued for one hour. The final reaction mixture was a light yellow slurry.

The reaction product was isolated using suction filtration and air dried overnight. A light yellow solid was obtained (120.7 g, 91.0% yield).

Acetic anhydride (150.0 g, 1.47 moles), 26.9 g (0.328 moles) sodium acetate, 3.30 g (0.033 moles) triethylamine and 100.0 g (0.328 moles) of the reaction product described in the preceding paragraph were added to a two-neck 500 ml round bottom flask equipped with a reflux condenser and a thermometer. The reaction mixture was stirred in an inert atmosphere at 70° C. for a period of 2 hours.

The crude product was precipitated from solution by the addition of 300 ml of ice water and collected by suction filtration. Two additional washings with ice water (100 ml) followed by filtration were necessary to remove trace anhydride. The recovered material was dried under vacuum overnight to yield 89.6 g (95.2% yield) of 3-(2,2-dimethyltrimethylene acetal)-1-maleimidobenzene.

EXAMPLE I

Twenty grams of silver flake of varying particle size was obtained by blending five different flakes in the percentages shown below:

| SILVER FLAKE | PERCENTAGE | SURFACE AREA ($m^2/g$) |
| --- | --- | --- |
| 50-S[a] | 22.0 | 3.80 |
| 26-LV[a] | 36.6 | 0.16 |
| EA0098[b] | 2.5 | 0.89 |
| EA0101[b] | 5.0 | 0.29 |
| SF-70[a] | 22.6 | 1.35 |
| EA0018[b] | 11.3 | 0.24 |

[a]silver flake obtained from Degussa Metz Metallurgical Corporation, South Plainfield, New Jersey.
[b]silver flake obtained from Chemet Corporation, Attleboro, Massachusetts.

Ten grams of the silver flake blend was set aside with the remaining 10 grams added to 5 milliliters of an acetone solution containing 0.5 grams of tartaric acid and 0.5 g of DTPA-Jeffamine M600 diamide in solution. The resulting mixture was placed in a sealed jar and maintained at 40° C. for sixteen hours. The solvent supernatant was then poured off and the remaining wet silver solids were transferred to a centrifuge jar. The silver solids were thoroughly resuspended in 5 ml of fresh acetone and the suspension was then centrifuged. The supernatant was again poured off and the rinsing process was repeated two more times. Finally, the moist silver was removed from the centrifuge jar and allowed to dry at room temperature. A small quantity of paste was made from the treated silver by dispersing 0.85 grams of the treated silver in 0.15 grams pure 1,1-bis(4-cyanatophenyl)ethane (employing no alkylphenol as solvent/diluent or as co-catalyst for polymerization of cyanate ester monomer). An analogous paste was also made using the untreated silver flake as a control.

The paste with the treated silver gave a fluid, low viscosity product at 85% solids. The cure profile for both pastes was determined by Differential Scanning Calorimetry (DSC). The control paste had an exotherm maximum at 162° C. and an exotherm onset at 104° C. The paste containing treated silver had an exotherm maximum at 209° C., with onset at 157° C. The paste containing treated silver had a pot life of approximately seven days at room temperature. The pot life of the control paste was less than one day at room temperature.

EXAMPLE II

A blend of silver powder of varying particle size was obtained by blending three different powders in the percentages shown below:

| SILVER POWDER | PERCENTAGE | SURFACE AREA ($m^2/g$) |
| --- | --- | --- |
| SP3001 | 28.6 | 0.67 |
| SP3002 | 38.1 | 1.29 |
| SP7002 | 33.3 | 1.96 |

All powders were obtained from Degussa Metz Metallurgical Corporation, South Plainfield, N.J.

The blended silver powder was treated as described in EXAMPLE I. Pastes were then made with treated and untreated material by dispersing 88% by weight solids in a mixture of polycyanate ester monomer comprising 85 wt. percent 1,1-bis(4-cyanatophenyl)ethane and 15 wt. percent 2,2-bis(4-cyanatophenyl)propane (employing no alkylphenol as solvent/diluent or as co-catalyst for polymerization of cyanate ester monomer).

The paste with the treated silver was a very fluid, low viscosity paste. DSC was performed on both pastes. The control pastes had an exotherm maximum at 165° C. with an onset at 107° C. The corresponding values for the paste containing the treated material by contrast, were 204° C. and 159° C., respectively. The pot-life of the control paste was less than one day whereas the pot life of the paste containing treated silver was greater than one week. The paste containing treated silver retained 98% of its original cure exotherm after 255 hours at room temperature. Moreover, the viscosity of this sample did not change during this period. The control paste retained only 87% of its original cure exotherm after 21.5 hours and was transformed into an unusable paste with a putty-like consistency.

EXAMPLE III

The silver powder blend used in this example was prepared as described in EXAMPLE II.

Ten grams of the powder blend was added to a solution of 0.7 grams of DTPA-Jeffamine M600 chelating lubricant in 5 ml of acetone. The mixture was then refluxed for 10 minutes. The resulting slurry was cooled and centrifuged. The supernatant was removed and the residue was resuspended in 5 ml of acetone. The rinse cycle was repeated three times before the silver solids were removed and dried at room temperature.

A paste was then made with treated material by dispersing 88% by weight solids in a mixture of polycyanate ester monomer comprising 85% 1,1-bis(4-cyanatophenyl)ethane and 15 wt. percent 2,2-bis(4-cyanatophenyl)propane (employing no alkylphenol as solvent/diluent or as co-catalyst for polymerization of cyanate ester monomer).

DSC performed on this paste revealed an exotherm onset at 158° C. with dual exotherm maxima at 190° C. and 242° C. These values were substantially better than values obtained for the control paste (see EXAMPLE II for control paste values). The pot life of the paste containing treated silver was approximately seven days.

EXAMPLE IV

A blend of silver flake of varying particle size was obtained by blending four different flakes in the percentages shown below:

| SILVER FLAKE | PERCENTAGE | SURFACE AREA ($m^2/g$) |
|---|---|---|
| RA0051 | 7.5 | 1.91 |
| RA0095 | 50.0 | 0.64 |
| RA0101 | 14.2 | 0.25 |
| XRA018 | 28.3 | 0.69 |

All flake was obtained from Chemet Corporation, Attleboro, Mass.

The blend flake was treated as described in EXAMPLE I. Pastes were then made with treated and untreated material by dispersing the flake in polycyanate ester monomer comprising 85 wt. percent 1,1-bis(4-cyanatophenyl)ethane and 15 wt. percent 2,2-bis(4-cyanatophenyl)propane (employing no alkylphenol as solvent/diluent or as co-catalyst for polymerization of cyanate ester monomer). Both pastes contained 83 wt. percent solids.

The treated silver paste was a fluid, low viscosity dispersion. DSC was run on both pastes. The control paste had an exotherm maximum at 152° C. with an onset temperature of 127° C. The paste containing the treated silver flake had an exotherm maximum at 206° C. and an onset temperature of 148° C. The pot life for the control paste was approximately 48 hours while the pot life of the paste containing treated silver retained useful dispense characteristics for about six days.

EXAMPLE V

A blend of silver flake of varying particle size was obtained by blending four different flakes in the percentages shown below:

| SILVER FLAKE | PERCENTAGE | SURFACE AREA ($m^2/g$) |
|---|---|---|
| RA0051[a] | 8.0 | 1.91 |
| RA0095[a] | 20.0 | 0.64 |
| SF69[b] | 48.0 | 0.25 |
| XRA0018[a] | 24.0 | 0.69 |

[a] silver flake obtained from Chemet Corporation, Attleboro, Massachusetts.
[b] silver flake obtained from Degussa Metz Metallurgical Corporation, South Plainfield, New Jersey.

The blended flake was treated as described in EXAMPLE I. Pastes were then made with treated and untreated material by dispersing flake in monomer comprising 92 wt. percent 1,1-bis(4-cyanatophenyl) ethane and 8 wt. percent 2,2,4-trimethylhexamethylene-1,6-bis-maleimide (employing no alkylphenol as solvent/diluent or as co-catalyst for polymerization of cyanate ester monomer). Both pastes contained 84 wt. percent solids.

The paste containing the treated material was a fluid, low viscosity dispersion. DSC analysis was performed on both pastes. The control paste had an exotherm maximum of 155° C. and an onset of 123° C. The paste containing the treated material had an exotherm maximum at 218° C. with an onset temperature of 180° C. The pot life of the control paste was approximately 40 hours, while the paste containing treated material retained useful dispense characteristics for about 10 days.

EXAMPLE VI

An attach paste was prepared with the following materials in the indicated wt. percentages:

| Component | Wt. % |
|---|---|
| 1,1-bis(4-cyanatophenyl)ethane containing 300 ppm dissolved cobaltic (III) acetylacetonate | 19.00 |
| fumed silica | 0.87 |
| silver flake | 80.13 |

The high surface area fumed silica is available as Aerosil 805 from Degussa Corporation, 65 Challenger Road, Ridgefield Park, N.J. The silver flake comprised 17 wt. percent flake having a surface are of 0.25 $m^2/g$ and 63.13 wt. percent flake having a surface area of 0.64 $m^2/g$. The flake had been treated with the non-ionic lubricant glycerol monooleate.

The silver flake and fumed silica were mixed with liquid cyanate ester (employing no alkylphenol as solvent/diluent or as co-catalyst for polymerization of cyanate ester monomer) in a ceramic vessel at room temperature until the solids were thoroughly wetted. The resulting paste was then processed on a three-roll mill until the dispersion became homogeneous. During processing, the mill was cooled with recirculating water maintained at 23±2° C. Using a Brookfield viscometer, the viscosity of the paste at 10 rpm was $170 \times 10^3$ centipoise. The thixotropic index, defined as the 1 rpm viscosity value divided by the 20 rpm value, was 11.00. This paste cured in two minutes at 200° C. to yield a tough adhesive bond with minimal voiding. The tensile strength of the paste was equal to or greater than 2600 psi immediately after curing. The tensile strength was unchanged after 100 temperature cycles between −65° and 150° C. The radius of curvature (a measure of residual stress left after cure) was 7.5±1.5 meters.

This paste composition had a pot life at room temperature of approximately eighteen hours. The product can be kept for more than six months with full retention of excellent dispense characteristics as long as the storage temperature is equal to or less than −40° C.

EXAMPLE VII

An attach paste was prepared with the following materials in the indicated wt. percentages:

| Component | Wt. % |
|---|---|
| 1,1-bis(4-cyanatophenyl)ethane | 12.72 |
| 2,2-bis(4-cyanatophenyl)propane | 2.25 |
| cobaltic(III) acetylacetonate | 0.023 |
| silver flake | 85.03 |

The silver flake comprised 6.80 wt. percent flake having a surface area of 1.91 $m^2/g$, 17.01 wt. percent flake having a surface area of 0.65 $m^2/g$ and 40,81 wt. percent flake having a surface area of 0.25 $m^2/g$. The flake had been treated with 0.5 percent tartaric acid and 5.0 percent DTPA-Jeffamine M600 (based on weight of flake) in acetone followed by 3× rinses in acetone.

The cyanate ester monomers (employing no alkylphenol as solvent/diluent or as co-catalyst for polymerization of cyanate ester monomer) were heated and stirred until a homogeneous liquid was obtained. The remaining ingredients were mixed with this liquid in a ceramic vessel until the solids appeared to be thoroughly wetted by the comonomer vehicle. The mixture was then processed on a three roll mill until a smooth, homogeneous paste was obtained.

The paste had a 10 rpm viscosity of $61 \times 10^3$ centipoise and a thixotropic index of 10.81. This paste could be cured in 5 minutes at 240° C. to yield a tough adhesive substantially free of voids. The post cure adhesion was at least 2600 psi and did not degrade even after 100 temperature cycles between $-65°$ and 150° C. The radius of curvature for this paste was found to be $4.5 \pm 0.3$ meters. Any radius of curvature greater than 1.0 meters is generally recognized in the art as characteristic of a functional attach paste.

This paste had a room temperature pot life of approximately 80 hours. The pot life of this product exceeds six months if stored at $-40°$ C.

EXAMPLE VIII

An attach paste was prepared with the following materials in the indicated wt. percentages:

| Component | Wt. % |
| --- | --- |
| 1,1-bis(4-cyanatophenyl) ethane | 10.8 |
| 2,2-bis(4-cyanatophenyl) propane | 1.9 |
| cobaltic(III) acetyl acetone | 0.02 |
| fumed silica | 0.2 |
| silver powder | 87.10 |

The fumed silica is the same product as that employed in Example VI. The silver powder comprised 24.9 wt. percent powder having a surface area of 0.67 $m^2/g$, 33.2 wt. percent powder having a surface area of 1.29 $m^2/g$ and 29.0 wt. percent powder having a surface area of 1.96 $m^2/g$.

The cyanate ester monomers (employing no alkylphenol as solvent/diluent or as co-catalyst for polymerization of cyanate ester monomer) were heated and stirred together to yield a homogeneous liquid. The solid ingredients were then added to this liquid and the mixture was thoroughly stirred until the solids were completely wetted by the liquid phase. The paste was then made homogeneous by means of three roll milling. The viscosity of the paste after milling was $175 \times 10^3$ centipoise at 10 rpm, and the thixotropic index was 9.81.

The paste was used to attach 500 mil$^2$ silicon dice to alumina substrates. The paste cured in 5 minutes at 240° C. to yield a tough nearly void-free bond. The tensile strength of this bond exceeded 2600 psi and was found to be unchanged even after 100 temperature cycles between $-65°$ and 150° C. The radius of curvature measured for this paste was $8.3 \pm 1.8$ meters.

This paste had acceptable dispensibility when stored at room temperature for approximately 100 hours and had a shelf life of at least six months when stored at $-40°$ C.

While the invention has been described in detail with reference to certain preferred embodiments thereof, it will be understood that modifications and variations are within the spirit and scope of that which is described and claimed.

That which is claimed is:

1. A composition for attaching a semiconductor device to a substrate, said composition comprising:
   8 to 20 wt. percent monomer vehicle comprising at least one polycyanate ester monomer;
   80 to 92 wt. percent electrically conductive filler; and
   50 to 1500 ppm metal catalyst;
   wherein said monomer vehicle is liquid under ambient conditions, and wherein said composition is free of alkylphenol.

2. A composition according to claim 1 wherein said filler is rendered substantially free of catalytically active metal ions.

3. A composition according to claim 2 wherein said filler is rendered substantially free of catalytically active metal ions by treatment with an ionic chelating agent.

4. A composition according to claim 3 wherein said chelating agent is tartaric acid, thiodiglycolic acid or dithiosuccinic acid.

5. A composition according to claim 4 wherein said chelating agent is tartaric acid.

6. A composition according to claim 3 wherein said chelating agent is also a lubricating agent.

7. A composition according to claim 6 wherein said chelating/lubricating agent is the reaction product of a dianhydride with a hydroxy or amino terminated poly (alkylene oxide).

8. A composition according to claim 2 wherein said filler is rendered substantially free of catalytically active metal ions by treatment with a reducing agent.

9. A composition according to claim 8 wherein said reducing agent is a covalent hydride.

10. A composition according to claim 9 wherein said reducing agent is a silicon hydride.

11. A composition according to claim 2 wherein said filler is rendered substantially free of catalytically active metal ions by treatment with a non-ionic lubricant.

12. A composition according to claim 11 wherein said non-ionic lubricant is a fatty acid of a monoester of glycerol.

13. A composition according to claim 1 wherein said electrically conductive filler is selected from silver, nickel, cobalt, copper, aluminum, or mixtures thereof.

14. A composition according to claim 13 wherein said filler is silver.

15. A composition for attaching a semiconductor device to a substrate comprising:
   13 to 20 wt. percent monomer vehicle comprising 1,1-bis(4-cyanatophenyl)ethane(I) and 2,2-bis(4-cyanatophenyl)propane(II);
   80 to 87 wt. percent silver filler; and
   50 to 500 ppm cobalt acetylacetonate;
   wherein said composition is free of alkylphenol.

16. A composition according to claim 15 wherein said monomers comprise from about 80 to about 95 wt. percent (I) and from about 5 to about 20 wt. percent (II), with the combined percentages representing total wt. percent vehicle.

17. A composition according to claim 1 wherein said vehicle further comprises additional monomer selected from the group consisting of vinyl ethers, divinyl ethers, diallyl ethers, dipropargyl ethers, propargyl allyl ethers, monomaleimides, bismaleimides and mixtures of any two or more such monomers.

18. A composition for attaching a semiconductor device to a substrate, said composition comprising:
   8 to 20 wt. percent monomer vehicle comprising at least one polycyanate ester monomer;
   80 to 92 wt. percent electrically conductive filler; and
   50 to 1500 ppm metal catalyst;
   wherein said monomer vehicle is liquid under ambient conditions, and wherein said composition is solvent free.

* * * * *